(12) United States Patent
Kuebel et al.

(10) Patent No.: US 9,470,255 B2
(45) Date of Patent: Oct. 18, 2016

(54) FASTENING ELEMENT FOR CONNECTING TWO COMPONENTS MADE OF DIFFERENT MATERIALS

(75) Inventors: Tobias Kuebel, Lauf A.D. Peg. (DE); Harry Mrugalla, Stein (DE); Thomas Nickl, Treuchtlingen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 393 days.

(21) Appl. No.: 14/123,337

(22) PCT Filed: May 23, 2012

(86) PCT No.: PCT/EP2012/059555
§ 371 (c)(1),
(2), (4) Date: Dec. 2, 2013

(87) PCT Pub. No.: WO2012/163750
PCT Pub. Date: Dec. 6, 2012

(65) Prior Publication Data
US 2014/0119812 A1 May 1, 2014

(30) Foreign Application Priority Data
May 31, 2011 (DE) .......... 10 2011 076 799

(51) Int. Cl.
| | |
|---|---|
| *F16B 9/00* | (2006.01) |
| *F16B 41/00* | (2006.01) |
| *F16B 9/02* | (2006.01) |
| *F16B 1/00* | (2006.01) |
| *E04B 1/24* | (2006.01) |
(Continued)

(52) U.S. Cl.
CPC .......... *F16B 9/023* (2013.01); *F16B 1/00* (2013.01); *E04B 1/2608* (2013.01); *E04B 7/045* (2013.01); *E04B 2001/2439* (2013.01); *F16B 9/00* (2013.01); *Y10T 403/39* (2015.01); *Y10T 403/3906* (2015.01); *Y10T 403/73* (2015.01)

(58) Field of Classification Search
CPC .......... E04B 1/2608; E04B 7/045; E04B 2001/2439; Y10T 403/73; Y10T 403/3906; Y10T 403/39; F16B 1/00; F16B 9/00
USPC .......... 403/188, 190, 363, 262; 52/712, 715; 248/300, 247
See application file for complete search history.

(56) References Cited

U.S. PATENT DOCUMENTS

| | | | |
|---|---|---|---|
| 3,996,465 A | 12/1976 | Beauchede et al. | |
| 4,022,537 A * | 5/1977 | Gilb ............. | E04B 1/2608 403/232.1 |
| 4,124,319 A * | 11/1978 | Hollingsead ....... | H02B 1/00 403/12 |

(Continued)

FOREIGN PATENT DOCUMENTS

| | | |
|---|---|---|
| DE | 7535521 U | 3/1976 |
| DE | 19908012 C2 | 8/2001 |

(Continued)

*Primary Examiner* — Chi Q Nguyen
(74) *Attorney, Agent, or Firm* — Laurence Greenberg; Werner Stemer; Ralph Locher

(57) ABSTRACT

A fastening element for interconnecting first and second components produced from different materials includes a metal strip and at least two fastening clips or lugs located in a common plane. An elastic bend compensating for longitudinal changes between the two fastening clips or lugs and a fastening point for the second component are disposed between the fastening clips or lugs.

2 Claims, 1 Drawing Sheet

(51) Int. Cl.
*E04B 7/04* (2006.01)
*E04B 1/26* (2006.01)

(56) References Cited

U.S. PATENT DOCUMENTS

| | | | | |
|---|---|---|---|---|
| 4,443,991 | A * | 4/1984 | Mieyal | E04B 2/7457 52/242 |
| 5,542,227 | A * | 8/1996 | Frayne | E04C 3/07 403/363 |
| 5,647,186 | A * | 7/1997 | Donaldson | E04B 2/60 403/363 |
| 5,687,529 | A * | 11/1997 | Pickering | E04B 1/0007 403/261 |
| 5,975,477 | A * | 11/1999 | Spitler | F21V 23/02 248/300 |
| 6,550,200 | B1 * | 4/2003 | Mueller | E04B 1/26 403/190 |
| 6,886,790 | B2 | 5/2005 | Soyris | |
| 7,134,252 | B2 * | 11/2006 | Thompson | E04B 1/26 248/248 |
| 2002/0020137 | A1 * | 2/2002 | Commins | E04B 1/2604 52/712 |
| 2005/0156308 | A1 | 7/2005 | Legen et al. | |
| 2010/0115872 | A1 * | 5/2010 | Holm | E04F 13/0807 52/506.06 |

FOREIGN PATENT DOCUMENTS

| | | |
|---|---|---|
| DE | 10333314 A1 | 2/2004 |
| DE | 10240589 A1 | 3/2004 |

\* cited by examiner

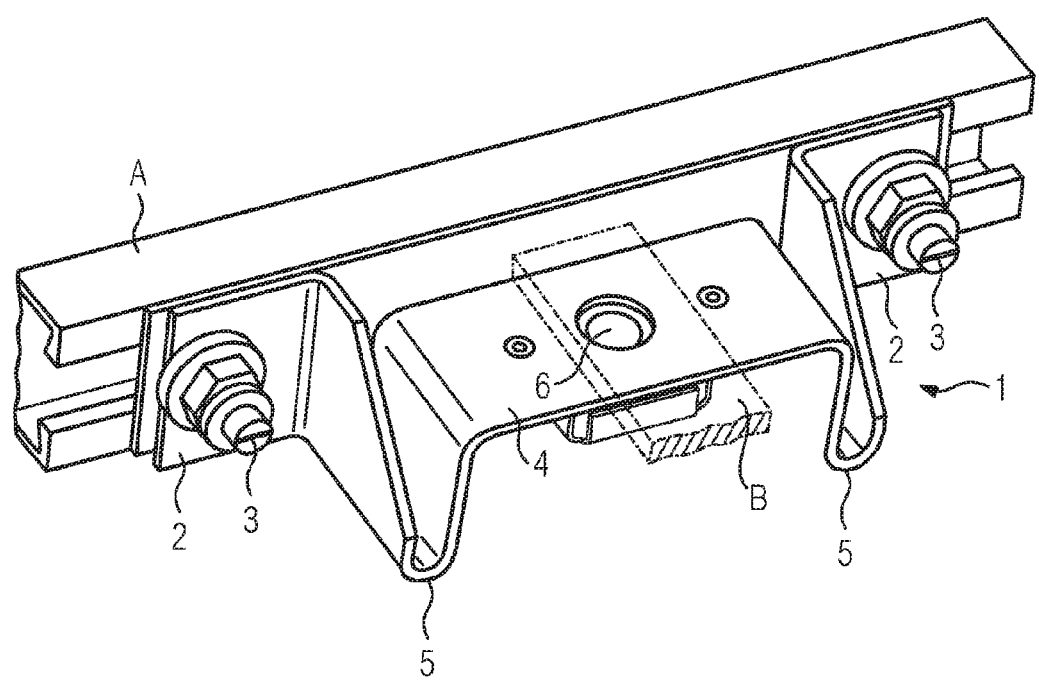

FASTENING ELEMENT FOR CONNECTING TWO COMPONENTS MADE OF DIFFERENT MATERIALS

BACKGROUND OF THE INVENTION

Field of the Invention

The invention relates to a fastening element for connecting a first component to a second component, the first and the second component being manufactured from different materials.

When connecting components made of different materials, such as for example aluminum-steel, within one fastening the problem of differing thermal expansion during operation arises. Such thermal expansion needs to be compensated in order to ensure lasting reliable fastening of the components to one another.

In the prior art, the problematic use of a fastening element for connecting components made of different materials having differing thermal expansion rates has been mostly avoided to date. This is done by using identical materials.

However, other solutions do exist which ensure differing thermal expansion rates are compensated, namely by using elastic fastening elements such as, for example, rubber mounts.

The avoidance of different materials has the disadvantage that, for example, the most favorable material in each case cannot be used for a corresponding purpose of use. The use of rubber mounts has the disadvantage that the functional life and service life are limited and it becomes necessary to replace the rubber mounts.

BRIEF SUMMARY OF THE INVENTION

Proceeding from here, the invention is based on the object of obtaining a fastening element for connecting a first component to a second component, which fastening element allows the use of different materials for the first and the second components and at the same time ensures a reliable connection between the components, even when temperature changes occur.

This object is achieved by the fastening element being manufactured from a sheet-metal strip and having at least two fastening clips which lie in a common plane, the fastening element having between said fastening clips an elastic bend for compensating changes in length between the two fastening clips and a fastening point for the second component.

The typically approximately Q-shaped bend allows changes in length based on thermal expansion of the first component between the two fastening clips. Here, the sheet-metal strip is of a substantially constant material thickness. However, on account of the shaping of the fastening element compensation of the changes in length is allowed, said compensation taking place in the region of the elastic bend.

The fastening point for the second component may lie in a planar central portion of the fastening element, the plane of this central portion being able to be perpendicular to the plane defined by the at least two fastening clips. In this way, the two components to be connected can be arranged in parallel planes or else in the same plane.

The bend may adjoin the central portion, said bend being in turn connected to one of the fastening clips at a right angle.

On the side of the fastening point which lies opposite the bend and inward of the fastening clip which is situated on said side, an identical further bend may be provided. In this case, both bends which are provided serve to compensate thermal expansion.

The fastening element may be configured in a particularly space-saving manner if it is configured symmetrically in relation to a transverse plane which runs through the fastening point for the second component. However, it is quite possible, for example, that the second fastening point for the second component lies at a different distance from the respective laterally arranged bends and fastening clips. Moreover, an immediate transition from a bend to a fastening clip is not absolutely necessary to achieve the effect of the invention.

BRIEF DESCRIPTION OF THE SEVERAL VIEWS OF THE DRAWING

An exemplary embodiment of the invention is explained in more detail in the following with reference to the drawing. The single FIGURE shows a perspective view of a fastening element for connecting two components made of different materials, both of the components being included in the illustration.

DESCRIPTION OF THE INVENTION

The fastening element 1 shown in FIG. 1 is present as a sheet-metal strip on each of whose ends a fastening clip 2 is provided. The fastening element 1 is connected via the fastening clips 2 to a first component A, which here is a stringer, present in the form of a C-rail, of a shell for a rail vehicle. The material of the first component A is steel. Here, fastening takes place by means of groove blocks (not illustrated), which engage in the C-rail, in combination with screw-fastening means 3.

Proceeding from the fastening clip 2, the fastening element 1, the material used for which is freely selectable, is bent at an approximate right angle and specifically in the opposite direction of the first component A.

The fastening element 1 exhibits a central planar portion 4 which is perpendicular to that plane which is defined by the fastening clips 2 of the fastening element 1. Proceeding from the central portion 4, a bend 5 adjoins in the direction of a respective fastening clip 2. In detail, the bend 5 is formed in each case by two parallel portions of the fastening element 1, which parallel portions are connected to one another by a portion having an approximately semi-circular shape. Here, that wall of the bend 5 which adjoins the fastening clips lying on the outside is beveled.

In order to connect a second component, for example made of aluminum, the central portion 4 has a suitable receptacle which serves as a fastening point 6 for the second component B.

On account of the shaping of the bends 5, the fastening element 1 is suitable for compensating changes in length which arise caused by thermal expansion of the first component A. This is because the bends 5 exhibit such elasticity that elongation/compression of the fastening element 1 in its longitudinal direction is possible to an adequate extent.

The invention claimed is:
1. A rail vehicle, comprising:
first and second components manufactured from different materials, said first component being a stringer of a shell for the rail vehicle formed as a C-rail; and
a fastening element for interconnecting said first and second components, said fastening element including:

a sheet-metal strip;
at least two fastening clips lying in a common plane along said sheet-metal strip, said at least two fastening clips being configured to fasten said first component;
two identical elastic bends disposed between said at least two fastening clips and configured to compensate for changes in length between said at least two fastening clips; and
a fastening point disposed between said at least two fastening clips and configured to fasten the second component;
each of said two identical elastic bends being disposed on a respective opposite side of said fastening point and inwardly of a respective one of said at least two fastening clips.

2. The rail vehicle according to claim 1, wherein said two identical elastic bends compensate for changes in length between said at least two fastening clips due to thermal expansion of said first component.

\* \* \* \* \*